United States Patent

Shiomi et al.

[11] Patent Number: 5,541,013
[45] Date of Patent: * Jul. 30, 1996

[54] SEALED TUBULAR LEAD-ACID BATTERY

[75] Inventors: Masaaki Shiomi; Toshiaki Hayashi; Katsuhiro Takahashi, all of Kyoto, Japan

[73] Assignee: Japan Storage Battery Co., Ltd., Kyoto, Japan

[*] Notice: The portion of the term of this patent subsequent to Jul. 30, 2008, has been disclaimed.

[21] Appl. No.: 450,940

[22] Filed: Dec. 15, 1989

[30] Foreign Application Priority Data

Dec. 21, 1988 [JP] Japan ................. 63-323027

[51] Int. Cl.⁶ ................................. H01M 10/06
[52] U.S. Cl. ................. 429/164; 429/204; 429/225
[58] Field of Search ................. 429/238, 132, 429/190, 252, 225, 204, 94, 164

[56] References Cited

U.S. PATENT DOCUMENTS

| | | | |
|---|---|---|---|
| 442,391 | 12/1890 | Pumpelly | 429/132 |
| 1,405,627 | 2/1922 | Petrie | 429/132 |
| 1,486,430 | 3/1924 | Hansen | 429/132 |
| 2,892,247 | 6/1959 | Honey . | |
| 3,064,066 | 11/1962 | Sundberg | 429/238 X |
| 3,172,782 | 3/1965 | Jache | 429/190 X |
| 3,402,077 | 9/1968 | Kida et al. | 429/190 X |
| 3,947,537 | 3/1976 | Buntin et al. | 429/254 X |
| 4,262,068 | 4/1981 | Kono et al. | 429/204 |

FOREIGN PATENT DOCUMENTS

| | | |
|---|---|---|
| 385707 | 10/1908 | France . |
| 60-86740 | 10/1986 | Japan . |
| 60176027 | 2/1987 | Japan . |
| 60277145 | 6/1987 | Japan . |
| 62-71260 | 10/1988 | Japan . |
| 272916 | 9/1928 | United Kingdom . |
| 787872 | 12/1957 | United Kingdom . |

OTHER PUBLICATIONS

Condensed Chemical Dictionary, 492 (10th ed. 1981).

Primary Examiner—Anthony Skapars
Attorney, Agent, or Firm—Sughrue, Mion, Zinn, Macpeak & Seas

[57] ABSTRACT

A sealed tubular lead-acid battery is provided which offers high-rate discharging performance and long cycle life by loading granules of fine particles of silicon dioxide both in a gap between a separator and around each of a positive and negative plate, as well as around the assembled element comprising a separator and the plates. An electrolyte is retained on the positive plate, the negative plate, the separator, and the granules of fine silicon dioxide particles.

5 Claims, 3 Drawing Sheets

SEALED TUBULAR LEAD-ACID BATTERY

BACKGROUND OF THE INVENTION

The present invention relates to an improvement on sealed lead-acid batteries using tubular positive plates. In particular, the present invention relates to a sealed tubular lead-acid battery having improved discharging performance and a longer cycle life.

In tubular positive plates, the active material for the positive electrode is encased in a tube and compressed from every side so that it will not be shed during charge and discharge cycles. Thus, lead-acid batteries using tubular positive plates are generally known to have a better cycle life performance than those using pasted electrode plates. It is also known that such tubular lead-acid batteries can be sealed by causing in situ gelation of a dilute sulfuric acid solution to which an inorganic oxide such as $SiO_2$ or $Al_2O_3$ has been added.

The gelled electrolyte described above has the sulfuric acid content immobilized within the gel so tightly that it will not diffuse easily. Hence, the discharge capacity of batteries using this electrolyte is significantly lower than that of conventional opened liquid electrolyte type batteries, especially during high-rate discharge. Further, as the battery is subjected to repeated charge and discharge cycles, a crack or a large hole will form in the gelled electrolyte to reduce the contact area with the positive plate. If this occurs, the positive active material will deteriorate rapidly since it undergoes local charge and discharge at a high current density. Thus, batteries using a gelled electrolyte have suffered the disadvantage that their cycle life performance is greatly inferior to that of batteries using a liquid electrolyte.

SUMMARY OF THE INVENTION

An object, therefore, of the present invention is to improve the high-rate discharging performance and cycle life of a sealed lead-acid battery using a tubular positive plate. The object is achieved by fabricating a sealed lead-acid battery of a "retainer type" in which the granules of fine particles of silicon dioxide are loaded both in a gap between a separator and around each of a positive and a negative plate, as well as around the assembled element comprising the separator and the plates. An electrolyte is retained in the positive plate, the negative plate, the separator and the granules of fine silicon dioxide particles.

DETAILED DESCRIPTION OF THE PREFERRED EMBODIMENT

The lead-acid battery of the present invention is described hereunder with reference to the accompanying drawings.

EXAMPLE 1

Figure 1:
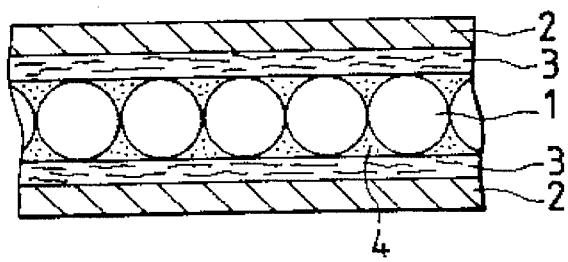
FIG. 1 is a cross-sectional view showing the essential part of the sealed tubular lead-acid battery of the present invention.

FIG. 1 is a cross-sectional view showing the essential part of the sealed tubular lead-acid battery of the present invention. As shown, it comprises a tubular positive plate 1, a pasted negative plate 2, a separator 3 and loaded granules of the fine particles of silicon dioxide 4, with an electrolyte being absorbed and retained by the assembled element and the $SiO_2$ granules.

Three tubular positive plates and four pasted negative plates, each having a height of 70 mm, were assembled into an element. Individual positive and negative plates were isolated by a separator in the form of a sheet of glass fibers having an average diameter of 5 μm. Silicon dioxide particles granulated to an average particle size of about 100 μm were loaded into the gap between electrode plates and around the assembled element; diluted sulfuric acid was injected to fabricate a retainer type battery A of the present invention from which a free liquid electrolyte was substantially absent. As a comparison, an opened liquid electrolyte type battery B and a gelled electrolyte type battery C were fabricated by injecting dilute sulfuric acid or dilute sulfuric acid containing 12% colloidal silica but without loading granules of silicon dioxide particles.

The battery samples thus fabricated were subjected to an initial capacity test (2 HR) and a charge/discharge cycle test (75% depth of discharge; 110% amount of charge) to evaluate their performance. The test results are shown in Table 1 below.

TABLE 1

| Battery | Initial discharge capacity (2 HR A · h) | Number of cycles required for the discharge capacity to drop to 70% or below |
|---|---|---|
| A | 30 | 1000 |
| B | 31 | 1000 |
| C | 23 | 600 |

Figure 2A:
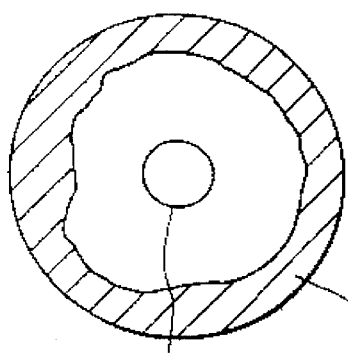
FIGS. 2a, 2b, 2c are diagrams showing the profiles of the discharge product $PbSO_4$ distribution at the positive plate.
Figure 2B:
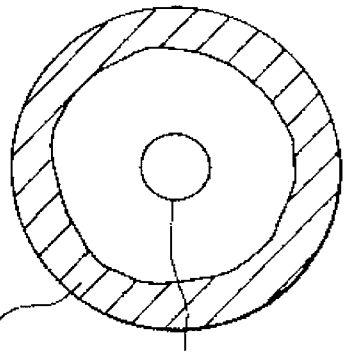
Figure 2C:
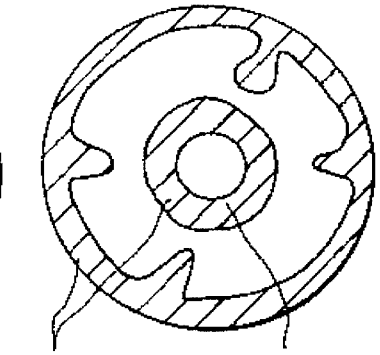

As is clear from Table 1, battery A of the present invention had an initial capacity which was about 30% higher than conventional gelled electrolyte type battery C. Further, its cycle life was about twice as long as that of battery C. The performance of battery A was almost comparable to that of battery B using a liquid electrolyte. In order to determine the reason for the superiority of the sample of the present invention, batteries A, B and C, which had undergone 500 charge/discharge cycles, were partly disassembled after being discharged. The distribution of $PbSO_4$ distribution of the discharged positive plate in each battery is shown in FIGS. 2a–2c respectively. As shown in FIGS. 2a–2c, $PbSO_4$ had formed uniformly at the positive plates of batteries A and B, whereas the $PbSO_4$ distribution in battery C was considerably nonuniform, with it concentration being particularly high in the neighborhood of the grid.

It is thus clear that the electrolyte made uniform contact with the positive plates to cause uniform discharge in both batteries A and B. However, uniform discharge did not occur in battery C probably because the electrolyte made only partial contact with the positive plates.

EXAMPLE 2

Figure 3:
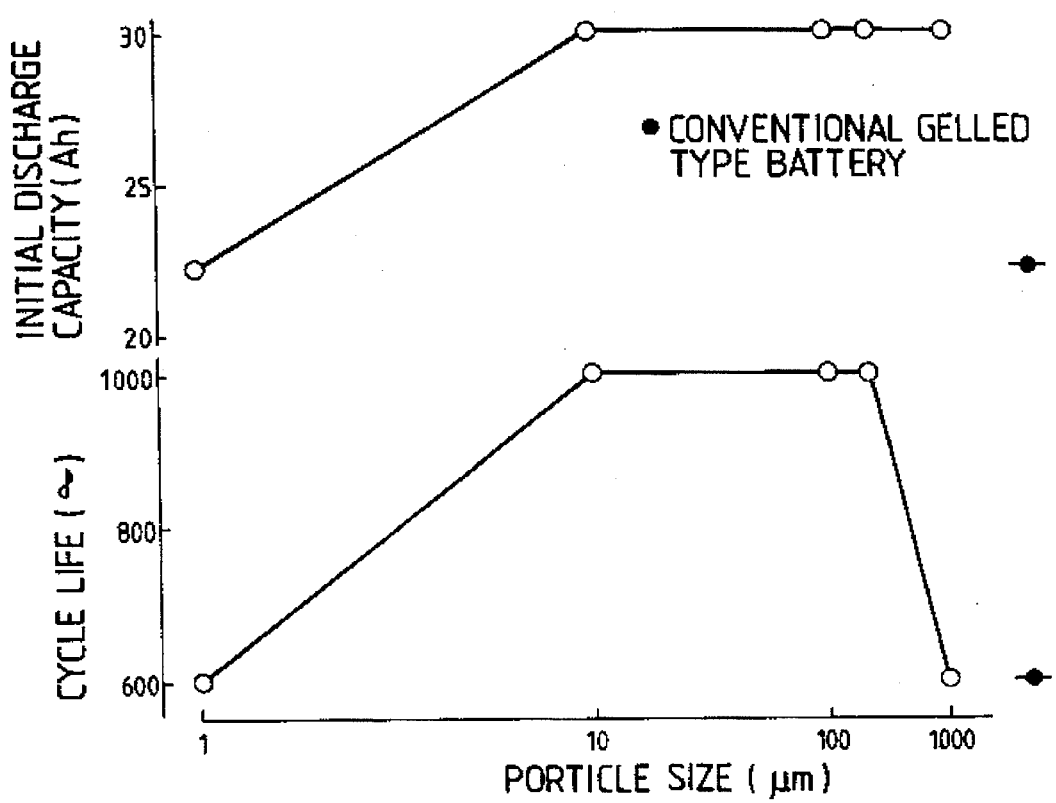
FIG. 3 is a characteristic diagram showing the discharge capacity and cycle life of a battery vs. the particle size of $SiO_2$ granules loaded in the battery.
Figure 4:
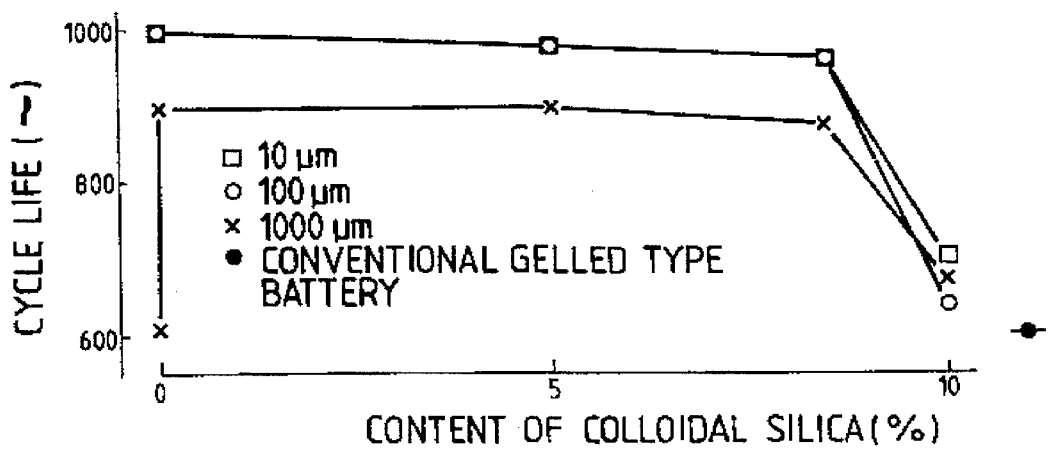
FIG. 4 is a characteristic diagram showing the relationship between the content of colloidal silica in the electrolyte and the cycle life of the battery.

Some other batteries were fabricated by repeating the procedure of manufacturing the battery A in Example 1, except that the average particle size of the granules of fine silicon dioxide particles was varied over the range of 1–1000 μm and that the concentration of colloidal silica in dilute sulfuric acid was varied from 0 to 10 wt %. The batteries so fabricated were subjected to the same tests as in Example 1. The results are shown in FIGS. 3 and 4. FIG. 3 is a characteristic diagram showing the discharge capacity and cycle life of the battery vs. the particle size of the $SiO_2$ granules, and FIG. 4 is a characteristic diagram showing the relationship between the content of colloidal silica in electrolyte and the cycle life of the battery. When the particle size of $SiO_2$ granules was outside the range of 10–500 μm, the discharge capacity and cycle life performance of battery dropped considerably. The battery that used $SiO_2$ granules larger than 500 μm and which had no colloidal silica added to the electrolyte offered poor life performance probably because the excessively large particles were insufficiently loaded in the gap between each electrode plate and the separator to retain the electrolyte, thus leading to "stratification" of electrolyte, a phenomenon in which different concentrations of electrolyte occurred as the number of charge/discharge cycles increased. However, when 0.1–9 wt % of colloidal silica was added as a thickener to the electrolyte, the battery's cycle life performance was markedly improved over the conventional gelled electrolyte type battery. The battery loaded with $SiO_2$ granules smaller than 10 μm also had low performance since the particle size was too small to insure thorough permeation by the electrolyte. It would, however, be possible to solve this problem by evacuating the battery while the electrolyte is injected or reducing the packing density of $SiO_2$ granules.

EXAMPLE 3

Figure 5:
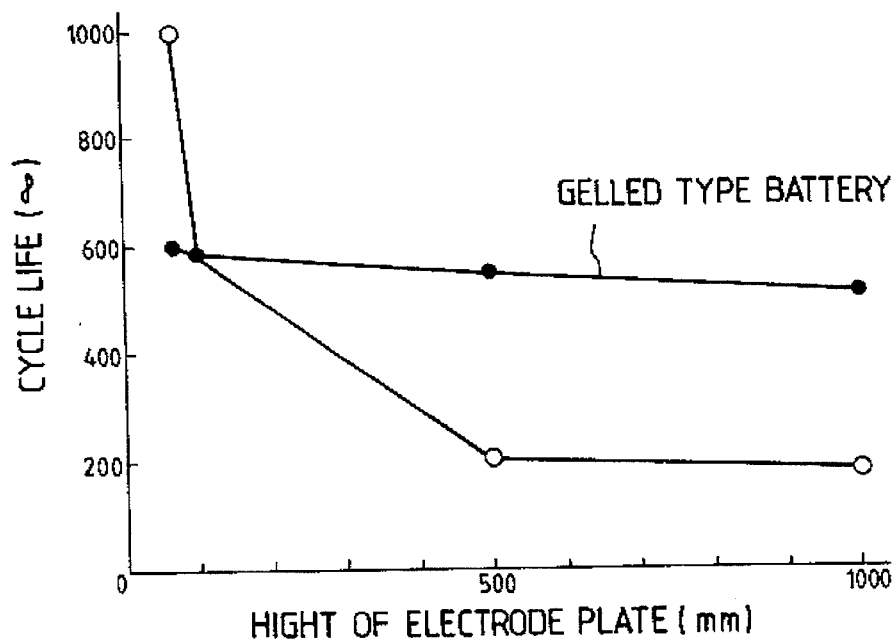
FIG. 5 is a characteristic diagram showing the relationship between the height of electrode plates and the cycle life of the battery.
Figure 6:
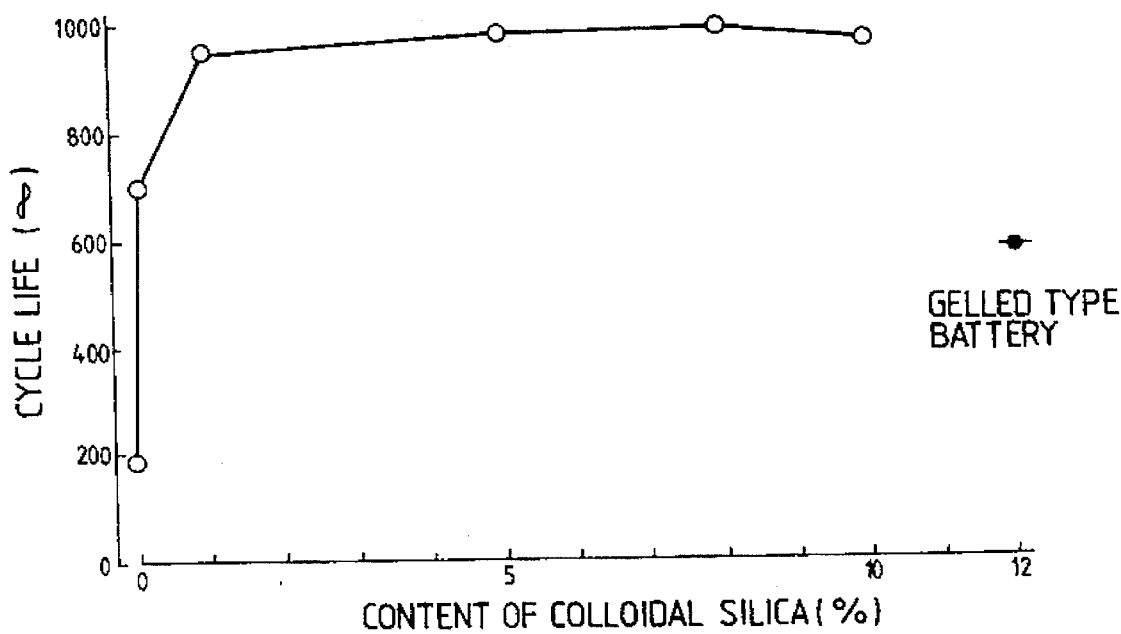
FIG. 6 is a characteristic diagram showing the relationship between the content of colloidal silica in the electrolyte in batteries of the present invention having a plate height of 1000 mm and the cycle life of the batteries.

Additional batteries were fabricated by repeating the procedure of manufacturing the battery A in Example 1, except that the height of electrode plates was varied from 70 to 1000 mm. The cycle life performance of the thus fabricated batteries was evaluated in comparison with the conventional gelled electrolyte type battery. The results are shown in FIG. 5 which is a characteristic diagram showing the relationship between the plate height and cycle life of the battery. As one can see from FIG. 5, the cycle life became very short, and was even shorter than that of the gelled electrolyte type battery, when the plate height exceeded 100 mm. This is probably because "stratification" of the electrolyte occurred as the plate height increased. To verify this assumption, batteries having a plate height of 1000 mm were fabricated with the content of colloidal silica in the electrolyte being varied from 0 to 10 wt %. The results are shown in FIG. 6 which is a characteristic diagram showing the relationship between the colloidal silica content and the cycle life of the battery. With 0.1 wt % or more colloidal silica being added, the cycle life was markedly improved and even longer than the gelled electrolyte type battery.

In Examples 1–3, the separator was made of glass fibers having an average diameter of 5 μm, but the present inventors confirmed that performance, better than that of the conventional gelled electrolyte type battery, was also attained even when glass fibers of which the range of an average diameter is 0.5–30 μm or a synthetic resin separator or a pulp separator was used. Furthermore, in examples 1–3 the similar particle size of $SiO_2$ granules was loaded, but even when the mixture of granules having a variety of particle size of 10–500 μm was used, the performance was better than that of gelled type battery.

As described on the foregoing pages, the sealed tubular lead-acid battery of the present invention offers markedly improved discharge capacity and cycle life over the prior art.

We claim:

1. A sealed tubular non-gel type lead-acid battery comprising an element including a tubular positive plate, a negative plate and a separator between said plates, wherein granules of fine particles of silicon dioxide having an average diameter greater than 10 μm and less than 1000 μm are loaded in a gap between said separator and each of said plates and around said element, and an electrolyte is retained in said element and said granules.

2. A sealed tubular non-gel type lead-acid battery according to claim 1, wherein said granules of fine particles of silicon dioxide have an average particle size of 10–500 μm.

3. A sealed tubular non-gel type lead-acid battery according to claim 1, wherein a height of said plates exceeds 100 mm and said granules of fine particles of silicon dioxide have an average particle size greater than 500 μm but less than 1000 μm and said electrolyte includes dilute sulfuric acid containing 0.1–9 wt % of one of colloidal silica and alumina.

4. A sealed tubular non-gel type lead-acid battery according to claim 1, wherein a height of said plates exceeds 100 mm and said electrolyte includes dilute sulfuric acid containing at least 0.1 wt % of one of colloidal silica and alumina.

5. A sealed tubular non-gel type lead-acid battery comprising an element including a tubular positive plate, a negative plate and a separator between said plates, wherein granules of fine particles of silicon dioxide having an average diameter of greater than 500 μm and less than 1000 μm are loaded in a gap between said separator and each of said plates and around said element, and an electrolyte, including dilute sulfuric acid containing 0.1–9 wt % of one of colloidal silica and alumina, is retained in said element and said granules, and wherein a height of said plates exceeds 100 mm.

* * * * *